(12) United States Patent
Chen (10) Patent No.: US 6,363,841 B1
(45) Date of Patent: Apr. 2, 2002

(54) ROASTER OVEN

(76) Inventor: Ying-Fu Chen, No. 13, Kai Fa 2nd Road, Jen Teh Hsiang, Tainan Hsien (TW)

( * ) Notice: Subject to any disclaimer, the term of this patent is extended or adjusted under 35 U.S.C. 154(b) by 0 days.

(21) Appl. No.: 09/816,196

(22) Filed: Mar. 26, 2001

(51) Int. Cl.[7] .......................... A47J 37/00; A47J 37/04; A47J 37/07

(52) U.S. Cl. .................... 99/421 H; 99/419; 99/427; 99/448

(58) Field of Search ............... 99/339–341, 419–421 V, 99/400, 401, 444–450, 476, 481, 482; 126/25 R, 9 R, 41 R, 41 B; 219/400–404, 386

(56) References Cited

U.S. PATENT DOCUMENTS

| | | | | |
|---|---|---|---|---|
| 6,009,797 A | * | 1/2000 | Lin | 99/419 X |
| 6,076,453 A | * | 6/2000 | Hsu | 99/427 X |
| 6,079,322 A | * | 6/2000 | Su | 99/419 X |
| 6,131,505 A | * | 10/2000 | Lin | 99/340 |
| 6,142,064 A | * | 11/2000 | Backus et al. | 99/421 H |
| 6,178,879 B1 | * | 1/2001 | Park | 99/419 X |

* cited by examiner

Primary Examiner—Timothy F. Simone (57) ABSTRACT

A roaster oven includes a rotatable frame and an oil tray. The rotatable frame consists of a left and a right rotatable disc member and a plurality of spits are provided between them. The right rotatable disc member has a plurality of recessed grooves for receiving spits. A plurality of projecting strips are formed to face the recessed grooves, respectively having an insert hole between each projection strip and each of the disc surface. The end of each spit is bent downward forming an insert strip with its lower portion shaped as a triangle-like stop strip for pushing against the bottom edge of the projection strip after the insert strip is inserted through the insert hole, thus finishing the assembly. Further, an oil-guiding member is provided near the bottom edges of three inner walls of the roaster oven and extends to an oil-receiving range of an oil tray.

3 Claims, 8 Drawing Sheets

ROASTER OVEN

BACKGROUND OF THE INVENTION

This invention relates to a roaster oven, particularly to one convenient to handle and easy to clean.

In order to roast food smoothly and completely in a roaster oven, manufacturers have designed a rotatable frame placed in a roaster oven as disclosed in Taiwan Utility Model Patent Publication No. 377783 (as attached appendix 'A') titled "Rotatable Frame of a Roaster Oven". This rotatable frame includes two rotatable discs positioned oppositely, having a plurality of spits provided there between. For the convenience of putting spits in or getting them out of the rotatable discs, one disc is provided around its outer circumferential edge with plural insert notches with a wide lower side and a narrow opening, and the end of each spit fitted in the disc is formed with a curved portion in two sides to constitute an inward recessed position member, and then the other end of the curved portion extends forward forming a press portion. So the spit can easily be put in or moved out of the insert recess just by pressing the spit and the press portion to make the distance between two sides of the position member smaller than the opening of the insert recess.

Although such design can solve the problem of the known conventional rotatable frame (as shown in the FIGS. 4 and 5 of appendix 'A') that a whole frame has to be moved out of a roaster oven in order to put a single spit in or take it out of a roaster oven. In practical handling it is uneasy to press the spit due to its large diameter (about 4 mm) and big strength unless a comparatively great force is imposed on it to let the spit deform and reduce the distance between two sides of the position portion.

Besides, an oil tray is provided on a bottom plate of a roaster oven so as to prevent oil coming out of roasting food from dripping directly on the bottom plate of the roaster oven, but this known conventional oil tray can only receive oil dripping from food itself, failing to receive such oil splashes on the inner walls of the roaster oven, thus letting oil gradually drip along the inner walls to the bottom plate, causing much trouble in cleaning.

Subsequently, a design for an oil tray of a roaster oven has come into existence, disclosed in a Taiwan Utility Model Patent Publication No. 356706 (as attached appendix 'B') titled "Oil Tray of a Roaster Oven". According to this design, the lower edges of three inner walls of a roaster oven are respectively provided with a recessed tray insert groove for an oil tray to fit therein, forming a larger range for receiving oil than that formed with three inner walls for oil drops, in other words, the lower edge of three inner walls located above the oil tray and within the range of the oil tray so as to let oil on the inner walls drip to the lower edges and into the oil tray, as shown in FIG. 4 of appendix 'B'.

However, it is found, through practical test, that the oil liquid on inner walls is sticky (particularly after roasting with high temperature) and possible to spread about, not easy to directly drip into the oil tray. Specifically, the oil will gradually drip to the lower edges of the inner walls and stay there, and, before the oil forms into oil drops to drip down, part of it will accumulate at the lower edges of the inner walls and on top walls of the tray insert grooves, as shown in FIG. 4 of appendix 'B', and gradually spread and then drip along the top and the inner walls of the tray insert groove down to the upper side of the bottom plate of a roaster oven, resulting in much trouble in cleaning.

SUMMARY OF THE INVENTION

One objective of this invention is to offer a roaster oven convenient to handle.

Another objective of this invention is to offer a roaster oven possible to let oil on its inner walls surely and completely drip into an oil tray placed inside so as to clean with easiness.

In order to attain the first objective, the roaster oven in this invention is provided with a rotatable frame inside for sticking food to be roasted. The rotatable frame consists of two protruding-out rotatable disc members positioned oppositely, and a plurality of spits provided horizontally between two rotatable disc members. Then, plural insert holes are provided spaced apart around an outer circumferential edge of the protruding surface of the left rotatable disc member for receiving pointed ends of the spits.

Another feature of the invention is the right rotatable disc member provided with several recessed grooves spaced apart around an outer circumferential edge for fitting the spits, and several projection strips, facing the recessed grooves, formed protruding out on the outer circumferential edge of the protruding surface of the right rotatable disc member, each projection strip having a vertical through insert hole between itself and the disc surface, the end of each spit facing the recessed groove and bending down in a right angle forming an insert strip with its end extending outward to form a triangle-like stop strip.

In assembling, the pointed end of each spit is inserted in the insert hole of the left disc member, and the other end of each spit is fitted in the recessed groove of the right disc member. Then, the insert strip of each spit protrudes through the insert hole, and at the same time, the elastic stop strip spreads outward, recovering its triangle-like shape and stably pushing against the bottom edge of the projection strip, and synchronously, the end of the stop strip rests against an inclined side of the disc, forming an auxiliary position member.

To attain another objective, the roaster oven in this invention is provided with an oil-guiding member formed protruding inward near the bottom edges of three inner walls. The oil-guiding member is positioned above an oil tray and its bottom end is shaped as a tapered cone extending to an oil-receiving range of the oil tray, letting the oil on inner walls of a roaster oven directly dripping into the oil tray.

BRIEF DESCRIPTION OF DRAWINGS

This invention will be better understood by referring to the accompanying drawings wherein.

Appendix:

A. a photocopy of Taiwan Utility Model Patent Publication No. 377783.

B. a photocopy of Taiwan Utility Model Patent Publication No. 356706.

DETAILED DESCRIPTION OF THE PREFERRED EMBODIMENT

Figure 1:
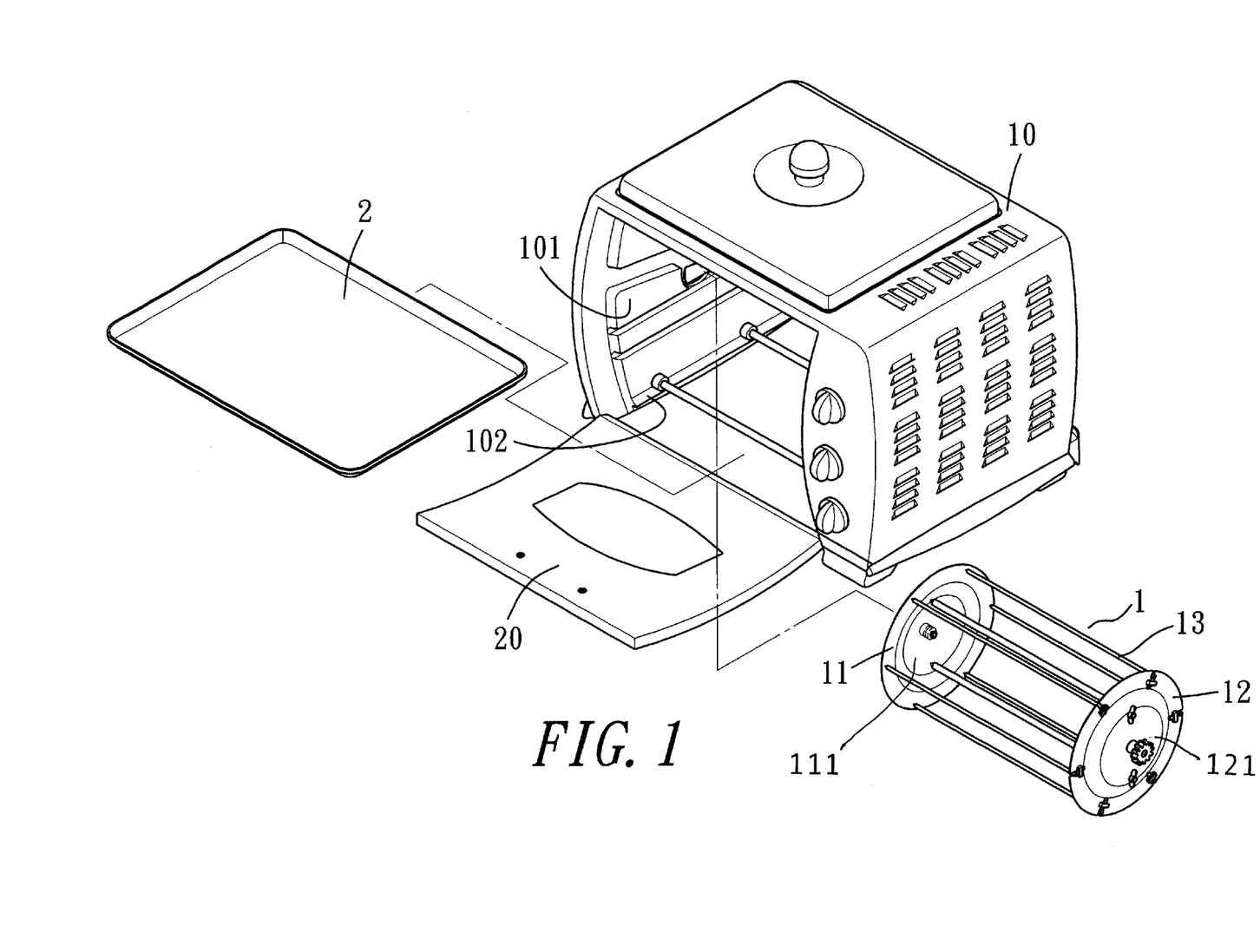
FIG. 1 is an exploded perspective view of a roaster oven in the present invention.

A preferred embodiment of a roaster oven 10 in the present invention, as shown in FIG. 1, includes a doorplate 20, a rotatable frame 1 and an oil tray 2 as main components combined together.

The doorplate 20 able to swing open outward and downward is pivotally provided at a lower side of the roaster oven 10.

Figure 2:
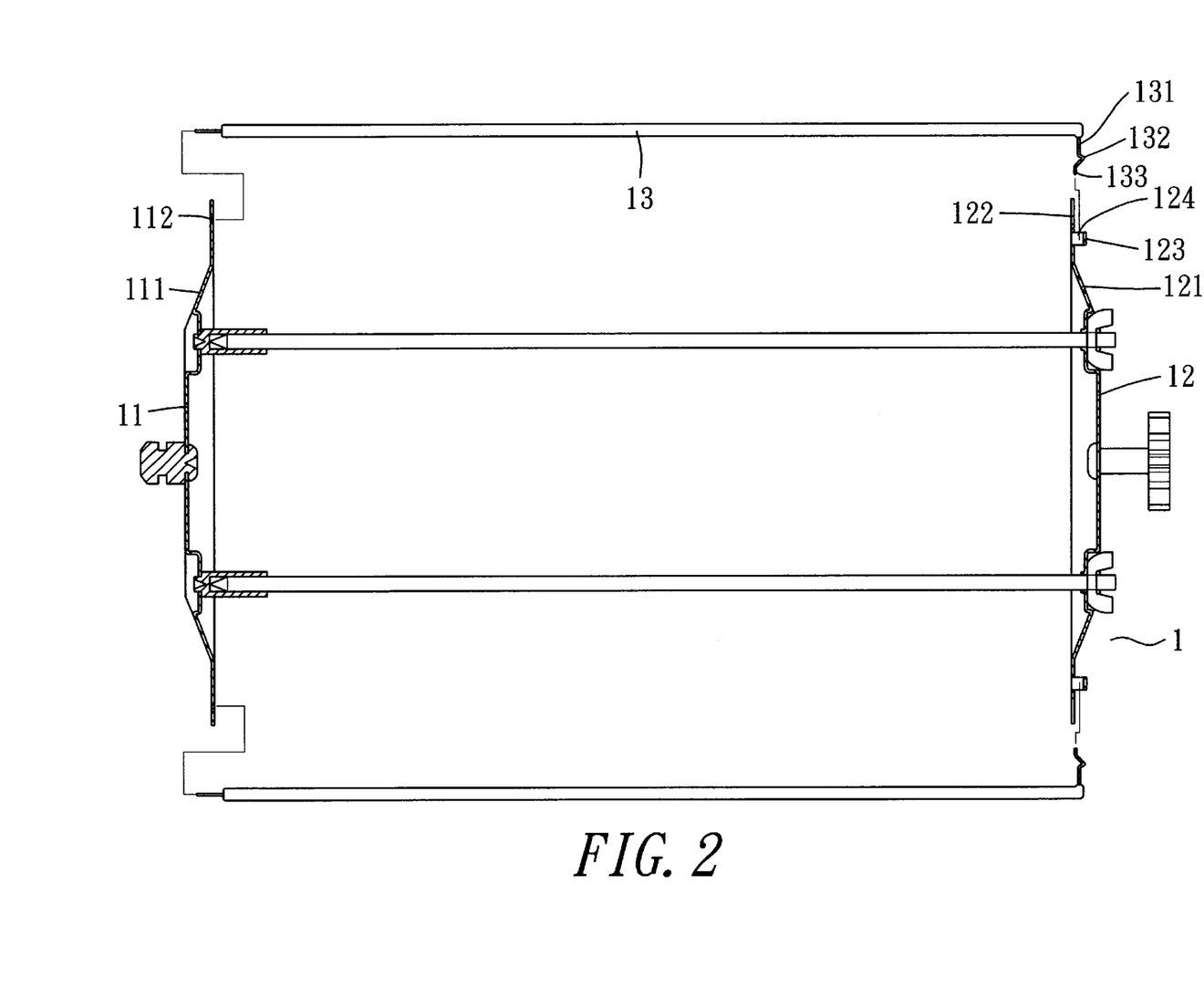
FIG. 2 is a partial side cross-sectional view of a rotatable frame in the present invention.
Figure 3:
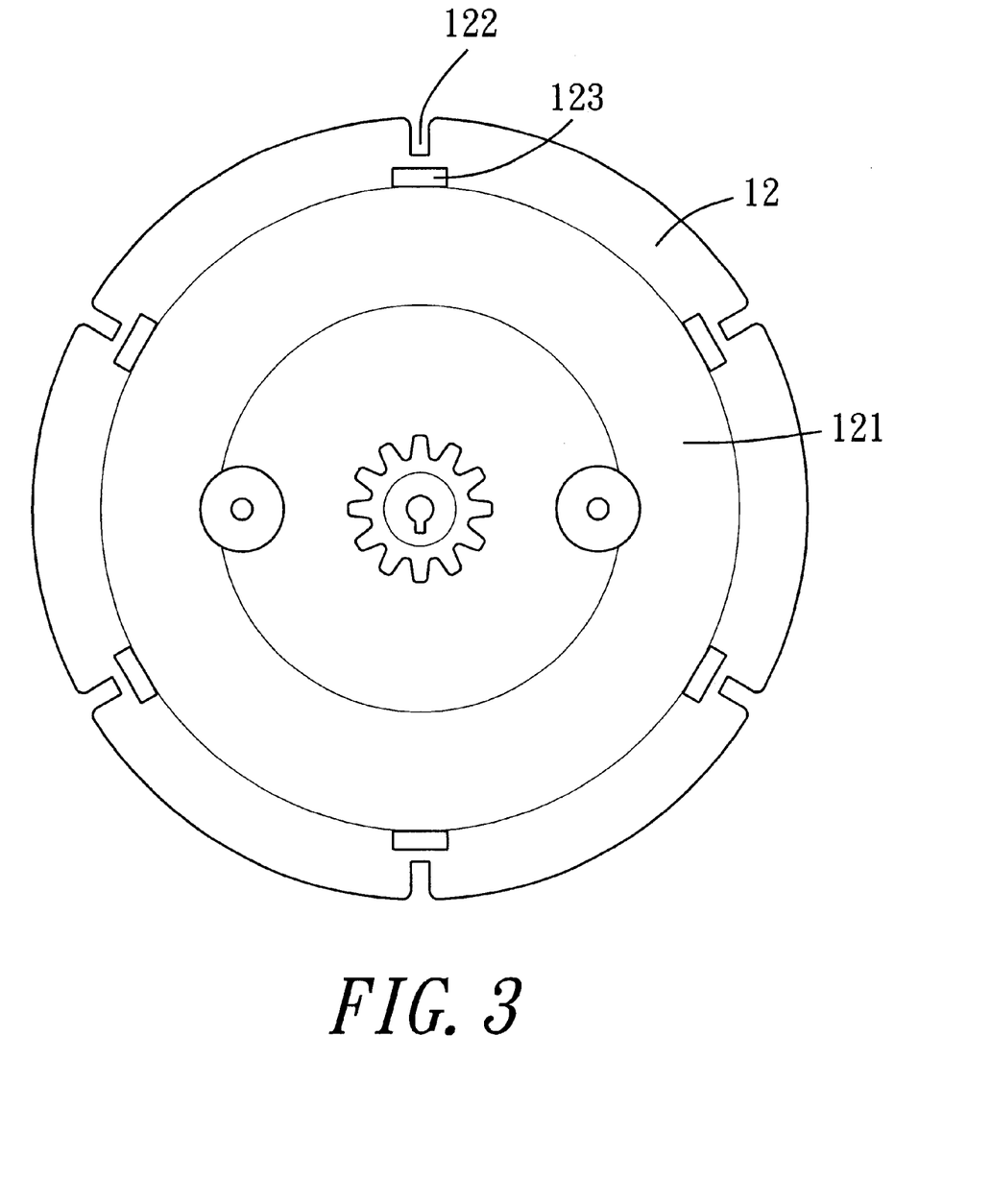
FIG. 3 is a side view of a rotatable disc of the rotatable frame in the present invention.

The rotatable frame 1, as shown in FIGS. 2 and 3, has two rotatable disc members 11–12 positioned oppositely, each rotatable disc member 11, 12 having on its center portion a protruding surface 111, 121, and a plurality of spits 13 positioned horizontally spaced apart between two rotatable disc members 11, 12. Then, plural insert holes 112 are bored around an outer circumferential edge of the protruding surface 111 of the left rotatable disc member 11 for receiving the pointed ends of the spits 13, and plural recessed grooves 122 are provided spaced apart around outer circumferential edge of the right rotatable disc member 12 for the spits 13 to fit therein.

In addition, referring to FIG. 3, a plurality of projecting strips 123, facing the recessed grooves 122, are formed protruding outward from the outer circumferential edge of the protruding surface 121 of the right disc member 12 and respectively have a through hole 124 bored vertically near the disc surface. Further, the end of each spit 13 to be fitted in the recessed groove 122 bends down in a right angle, forming an insert strip 131 and the lower portion of the insert strip 131 extends outward forming a triangle-shaped stop strip 132 with its straight end extending downward forming a push end 133.

Figure 4:
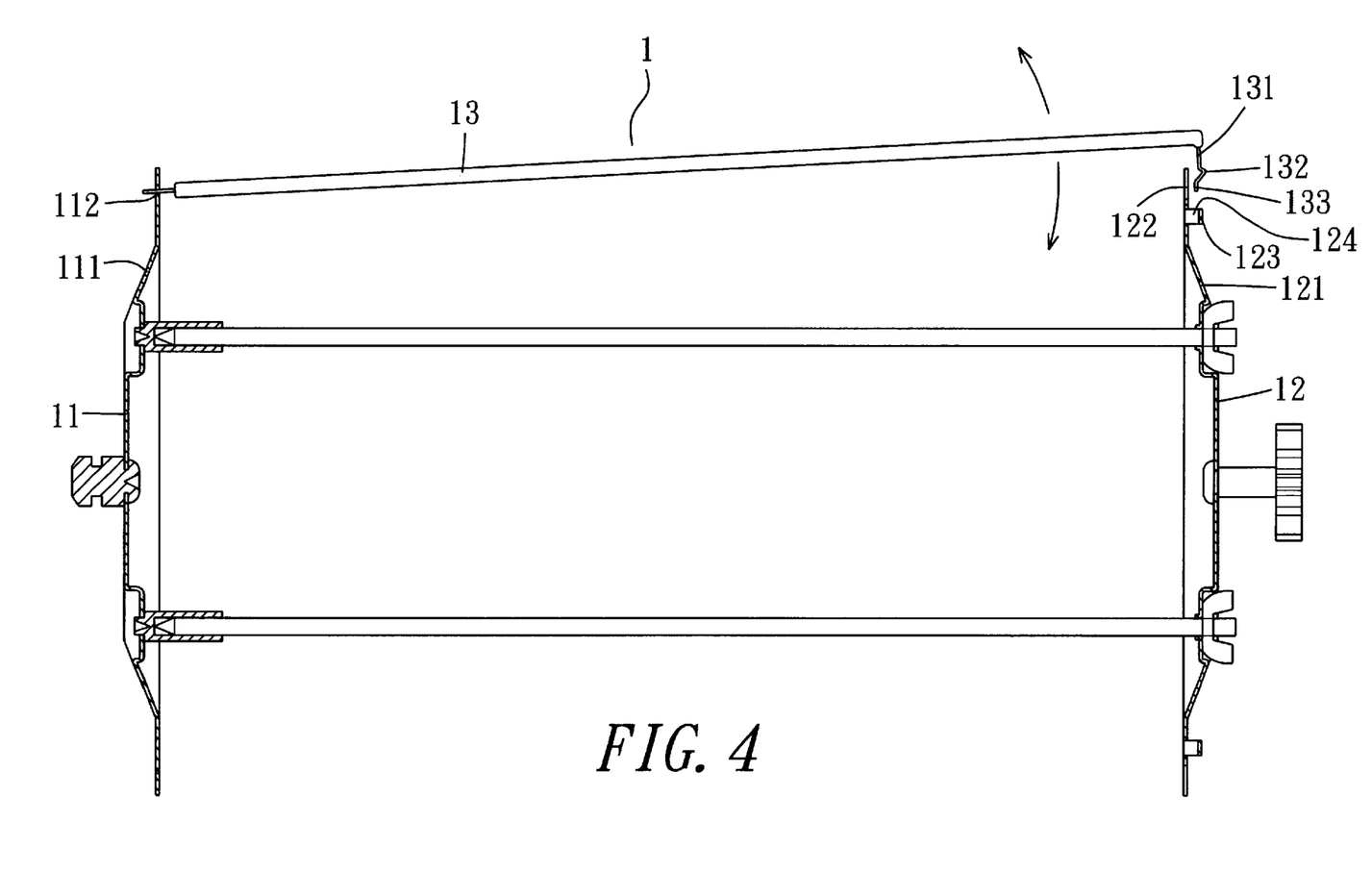
FIG. 4 is a partial side cross-sectional view of the rotatable frame in assembling process in the present invention.
Figure 5:
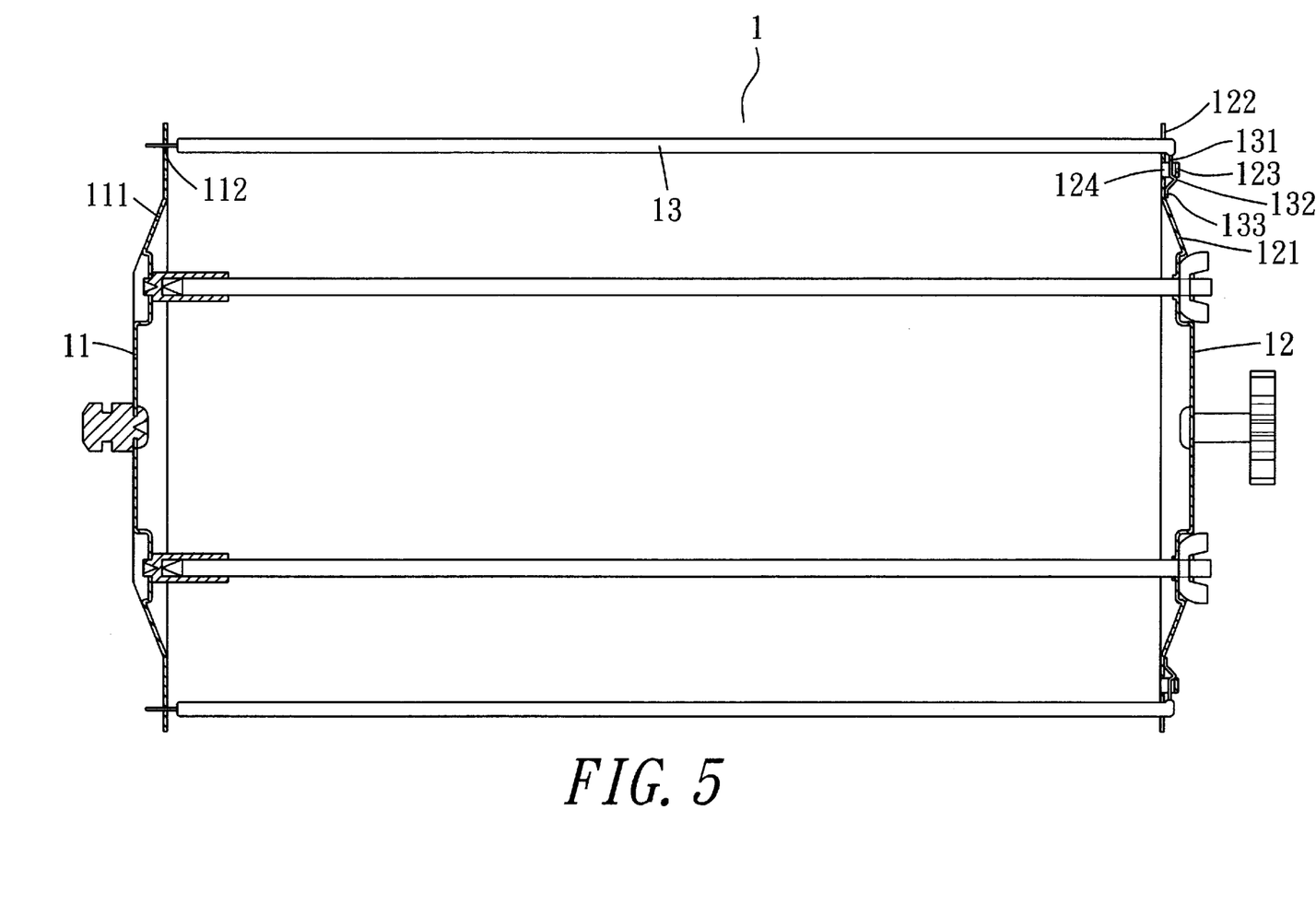
FIG. 5 is a side cross-sectional view of the partial rotatable frame already assembled in the present invention.
Figure 6:
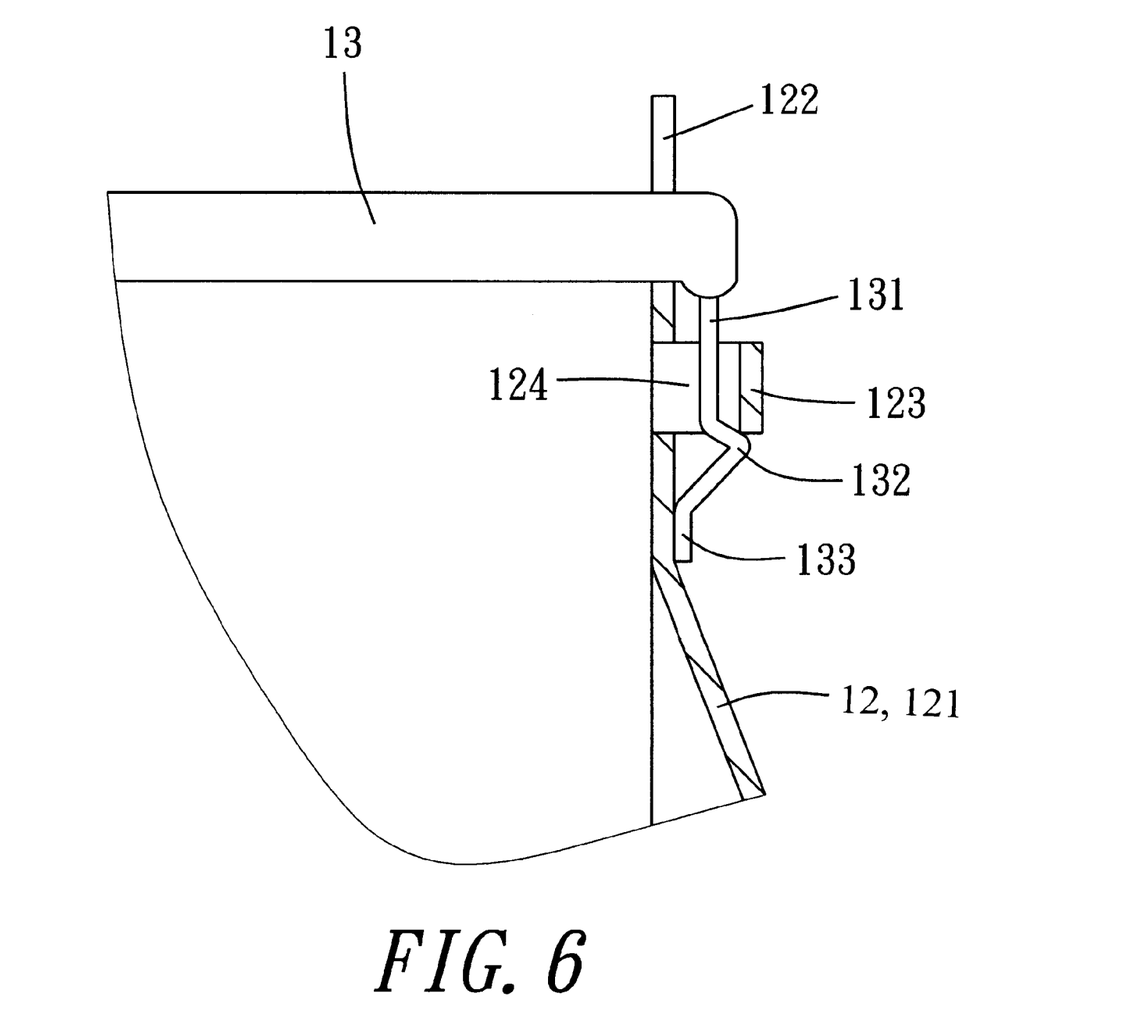
FIG. 6 is partial magnified side cross-sectional view of FIG. 5.

In assembling, the spits 13 together with the rotatable rack 1, as shown in FIG. 4, firstly insert the pointed end of each spit 13 into the insert hole 112 of the left disc member 11 and the other end of each spit 13 is fitted in the recessed groove 122 of the right disc member 12, as shown in FIG. 5. Insert the insert strip 131 of each spit 13 through the vertical insert hole 124 of the projection strip 123 and lastly press each spit 13 so as to let the triangle-like stop strip 132 at the lower portion of the insert strip 131 deformed into a straight shape and protruding out of the insert hole 124 and instantly recovering its original shape to stably push against the bottom edge of the projection strip 123 (i.e. the top side of the triangle-like stop strip 132 pushes against the bottom side of the projection strip 123), and at the same time, the push end 133 of the stop strip 132 rests against an inclined side of the protruding surface 121 of the right disc member 12, thus forming a two stage positioning, as shown in FIG. 6.

On the contrary, to disassemble the spit 13 from the recessed groove 122 and two disc members 11 and 12, just pull up the end of each spit 13 having insert strip 124 of each spit 13 to permit the stop strip 132 deforming and passing through the insert hole 124 and then disengaging from the projection strip 123.

Figure 7:
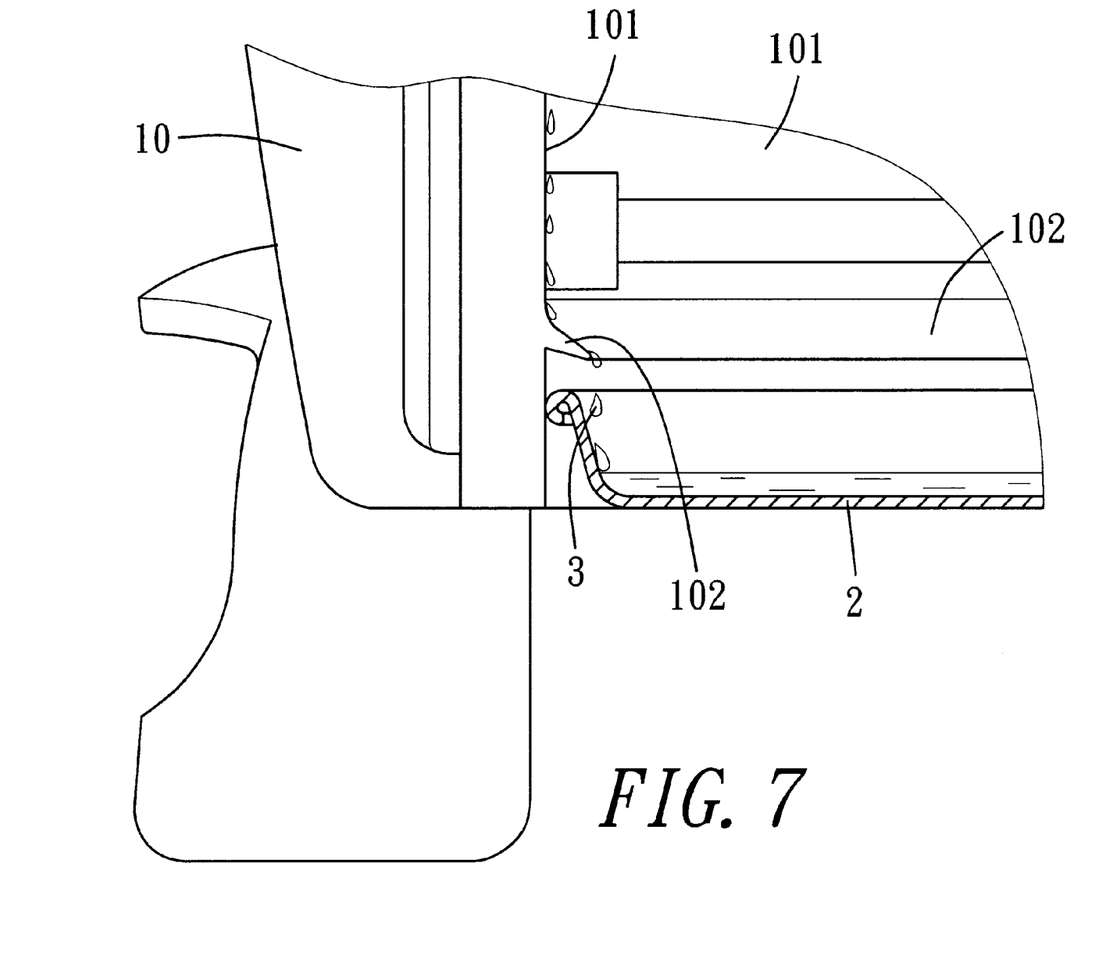
FIG. 7 is a front view of an oil tray receiving oil drops dripping from an inner wall of the roaster oven in the present invention.
Figure 8:
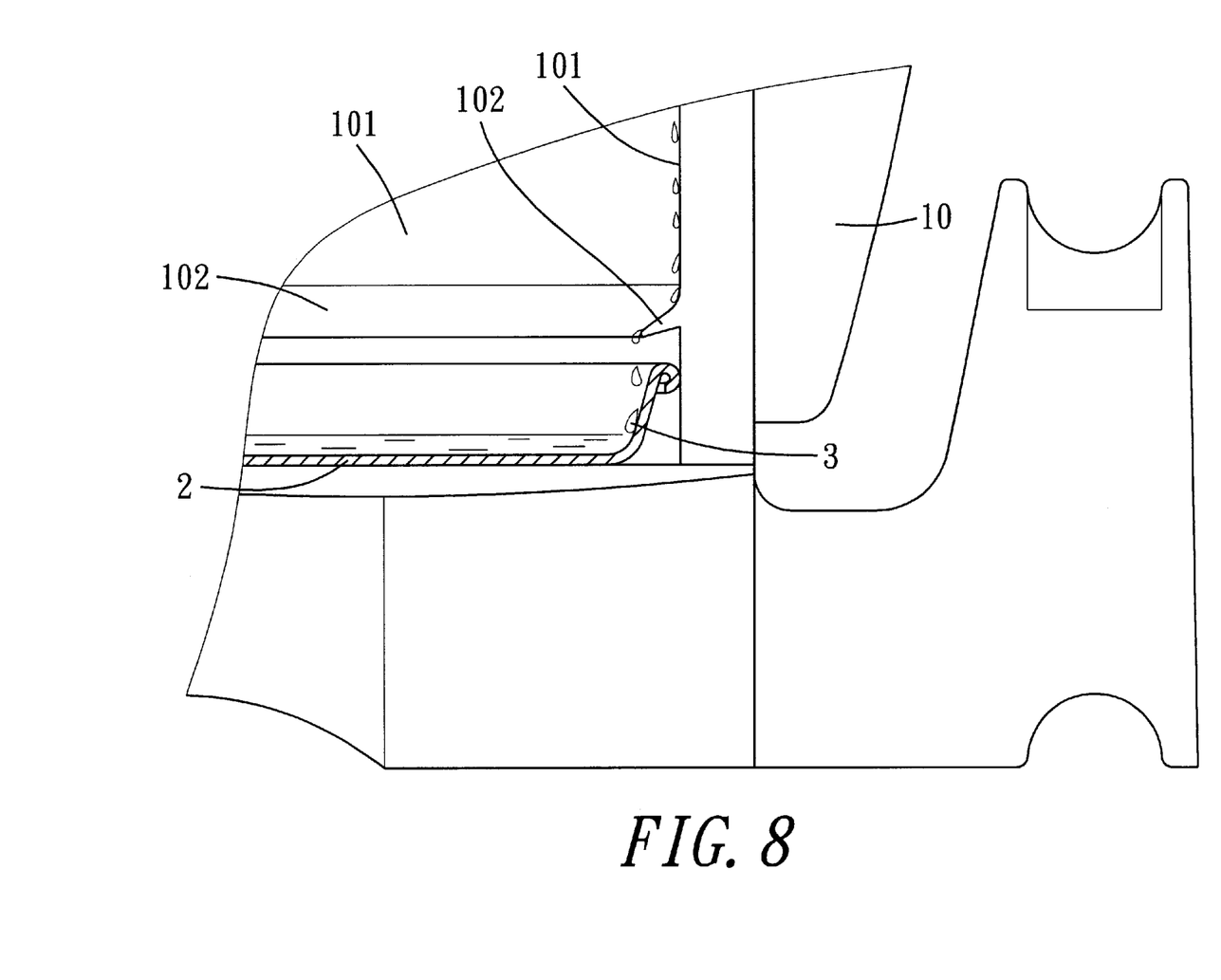
FIG. 8 is a side view of the oil tray receiving oil drops dripping from the inner wall of the roaster oven in the present invention.

In addition, the roaster oven 10 of this invention is further provided with an oil-guiding member 102 protruding inward near the bottom edge of the left, the right and the rear inner wall surfaces 101, as shown FIGS. 1, 7 and 8. The oil-guiding member 102 is positioned above an oil tray 2, with its lower end shaped as tapered cone extending to reach within an oil receiving range of the oil tray 2.

As can be noted from above description, the present invention is the same as a known conventional one in assembling the spit 13 together with the right rotatable disc member 12 by way of inserting, but this invention is comparatively easy and convenient in the process of assembling and disassembling the components, needless to take much energy for pressing the spit 13 to insert in or disengage from the rotatable disc member 12.

Furthermore, this invention surpasses the known conventional one in stabilizing the combination of the spits 13 and the right rotatable disc member 12 by providing two stage positioning, letting the triangle-like stop strip 132 of the insert strip 131 and the push end 133 respectively push against the bottom side of the projection strip 123 and the inclined side of the protruding surface 121 of the right rotatable disc member 12.

Moreover, while food is being roasted, the oil guiding member 102 can make oil 3 which splashes on three inner walls of the roaster oven 10 directly move into an oil tray, as shown in FIGS. 7 and 8, not to spread all over the inner walls and drip down on the bottom plate of the roaster oven 10.

To sum up, this invention has the following advantages:

1. A design of mutual engagement of the insert strip 131 of each spit 13 and each projecting strip 123 of the right disc member 12 makes it possible to handle with easiness.

2. A design of the oil-guiding member 102 lets oil 3 on the inner walls of the roaster oven 10 surely drip into the oil tray, preventing any oil liquid from remaining on the bottom plate of the roaster oven 10, convenient in cleaning.

While the preferred embodiment of the invention has been described above, it will be recognized and understood that various modifications may made therein and the appended claims are intended to cover all such modifications that may fall within the spirit and scope of the invention.

What is claimed is:

1. A roaster oven comprising:

a rotatable frame having a left and right rotatable disc members respectively having on its center portion a protruding surface, and a plurality of spits provided between said two rotatable disc members;

an oil tray provided on a bottom of said roaster oven;

said left rotatable disc member having a plurality of insert holes bored spaced apart around an outer circumferential edge of said protruding surface for receiving pointed ends of said spits;

said right rotatable disc member having a plurality of recessed grooves provided spaced apart around an outer circumferential edge for fitting said spits, a plurality of outward projection strips facing said recessed grooves and formed around on an outer circumferential edge of said protruding surface of said right disc member, a vertical insert through hole bored between said projection strip and said right disc member surface;

an end of each said spit fitted in each said recessed groove and bending down in a right angle forming an insert strip, said insert strip passing through said vertical through hole of said right rotatable disc member and having its lower portion spreading outward to form a curved triangle-like stop strip;

each said spit inserted into said insert hole of said left rotatable disc member, the other end of each said spit engaging each said recessed groove of said right disc member with said insert strip protruding through said vertical insert hole and pushing against the bottom edge of said projecting strip by means of said spreading-out stop strip, the end of said insert strip resting against an inclined surface of said right rotatable disc member, assembling said roaster oven.

2. The roaster oven as claimed in claim 1, wherein an end of said stop strip of said insert strip extends in the same direction as said insert strip to form a push end, said push end stably resting against said inclined surface of said right rotatable disc member.

3. The roaster oven as claimed in claim 1, wherein an oil-guiding member is provided protruding inward near a bottom edge of a left, a right and a rear inner wall of said roaster oven, said oil-guiding member located above said oil tray and having its bottom shaped as a tapered cone and extending to an oil receiving range of said oil tray.

* * * * *